United States Patent [19]

Ono et al.

[11] Patent Number: 5,070,424
[45] Date of Patent: Dec. 3, 1991

[54] ROTARY DRUM ASSEMBLY FOR A VIDEO TAPE RECORDER

[75] Inventors: Hiroaki Ono; Shinji Ozaki; Shinji Okada, all of Katsuta, Japan

[73] Assignee: Hitachi, Ltd., Tokyo, Japan

[21] Appl. No.: 447,556

[22] Filed: Dec. 7, 1989

[30] Foreign Application Priority Data

Dec. 28, 1988 [JP] Japan ................... 63-331377

[51] Int. Cl.$^5$ ............................... G11B 5/52
[52] U.S. Cl. .................................. 360/108
[58] Field of Search ..................... 360/107, 108

[56] References Cited

U.S. PATENT DOCUMENTS 4,184,183  1/1980  Dolby ........................... 360/107
4,654,738  3/1987  Kato et al. ................... 360/108

FOREIGN PATENT DOCUMENTS 57-42627A  3/1984  Japan .

Primary Examiner—Robert S. Tupper
Attorney, Agent, or Firm—Antonelli, Terry, Stout & Kraus

[57] ABSTRACT

A rotary drum assembly for a VTR including a rotary drum and a disk. The rotary drum fixedly holding magnetic heads, and first power feeding members (slip rings) included in a power feeding unit for feeding power to electronic signal processing circuit for processing signals for the magnetic heads are provided concentrically on the surface of the disk fixed to a spindle. First connecting members, fixedly provided on the rotary unit, connected to a wiring board connected to the terminals of the coils of the magnetic heads to transmit signals to or from the magnetic heads and to feed power fed through the first power feeding members of the power feeding unit to the wiring board, and second connecting members, provided between the wiring board and the first power feeding members, are secured to support plates, and the support plates are disposed in a region radially inside mating surfaces which are brought into contact each other in attaching the rotary drum to the disk.

8 Claims, 3 Drawing Sheets

ROTARY DRUM ASSEMBLY FOR A VIDEO TAPE RECORDER

BACKGROUND OF THE INVENTION AND RELATED ART STATEMENT

The present invention relates to the construction of a rotary drum assembly for video tape recorder (VTA).

The rotary drum assembly for a VTR must be constructed so that each of the magnetic heads supported thereon can be actually brought into contact with a magnetic tape accurately at a set position on the magnetic tape and at a fixed contact pressure. Accordingly, the eccentricity of the rotary drum of the rotary drum assembly supporting the magnetic heads must be reduced to the smallest possible value. The eccentricity of the rotary drum in the present state of the art is on the order of several micrometers. In a conventional rotary drum, as shown in FIG. 7, to limit the eccentricity of the rotary drum to such a small value, magnetic heads 10 are supported on a rotary drum 9 fitted on a disk 1 mounted on a spindle 5 by press fitting. The spindle 5 is supported on bearings 7 on a stationary drum 2 disposed beneath the rotary drum 9 and is rotated at a high rotating speed by a driving motor, not shown. The eccentricity of the rotary drum 9 ca be reduced by improving machining accuracy for the mating surfaces A of the disk 1 fitting to the mating surface of the rotary drum 9, and improving machining accuracy for the rotary drum seating surfaces B of the disk 1 determining the axial position of the rotary drum 9, namely, the height of the rotary drum 9 from a datum plane. For example, the disk 1 is finished so that the eccentricity of the mating surfaces A is in the range of zero to several micrometers and the rotary drum seating surfaces B is finished with a desired high accuracy in respect of runout and the axial position of the rotary drum. The mating surface of the rotary drum 9 mating with the mating surfaces A of the disk 1 is finished in a transition fit or an interference fit, and the rotary drum 9 is attached to the disk 1 by pressing using a jig. Thus, the eccentricity of the contact surface 7 of the rotary drum 9 to be in contact with a magnetic tape is limited to a value below several micrometers. No problem arises in the conventional rotary drum assembly thus constructed when incorporated into an ordinary VTR, such as a domestic VTR which does not require the replacement of the rotary drum 9 with a new one, which is necessary when the magnetic heads 10 are abraded and the service life of the rotary drum 9 is terminated, because the VTR is not that frequently used. However, a VTR for business purposes which is used very frequently, such as a VTR for broadcasting business, requires frequent change of the rotary drum 9 upon the termination of the service life of the magnetic heads 10 due to abrasion, and ease in replacing the rotary drum 9 with a new drum is one of the important requirements of the business VTR. Accordingly, the mating surfaces A of the rotary drum of a business VTR are finished with an accuracy corresponding to a low-class running fit to give the highest priority to preventing the seizure of the rotary drum 9 by the disk 1 and to facilitate removing and replacement of the worn rotary drum 9. Drum on the disk 1. Consequently, the eccentricity of the contact surface of the rotary drum 9, as mounted on the disk, is increased and hence skill and much time are required for correcting the eccentricity of the rotary disk.

OBJECT AND SUMMARY OF THE INVENTION

It is an object of the present invention to provide a rotary drum assembly of a simple construction which facilitates the replacement of a rotary drum when the service life of the rotary drum is terminated by the abrasion of magnetic heads supported thereon and which eliminates the positional adjustment of the new rotary drum for correction for eccentricity.

It is another object of the present invention to provide a rotary drum assembly incorporating a simple a power feeding unit to and construction which facilitates a connecting to and removing of from a rotary drum unit.

A rotary drum fixedly holding magnetic heads and first power feeding members, such as conductive rings (slip rings), included in a power feeding unit provided in a rotary drum unit to feed power to an electronic signal processing circuit for processing signals provided by the magnetic heads are fixed concentrically on the surface of a disk fixed to a spindle.

First connecting members fixedly provided on the rotary drum unit and connected to a wiring board connected at least to the terminals of the magnetic heads to transmit signals provided by the magnetic heads and to transmit power from the first power feeding members to the wiring board, and second connecting ;members provided between the wiring board and the first power feeding members are fixed to a supporting member, such as a base plate, and the supporting member is attached to the inner surface of a portion of the rotary drum engaging the disk.

The first and second connecting members are provided with structures capable establishing a conductive state by the contact of conductive elements, typically, pin connectors or socket connectors.

First mating surfaces of the disk to mate with the mating surface of the rotary drum, first seating surfaces of the same for determining the axial position of the rotary drum, second mating surfaces of the disk to mate with the first power feeding members, and second seating surfaces of the same for determining the axial position of the first power feeding members are machined simultaneously with reference to the center axis of the spindle to form the first and second mating surfaces concentrically with a high accuracy and to form the first and second seating surfaces with a high accuracy in relative axial position. In mounting the rotary drum on the disk, the rotary drum is seated on the first seating surfaces of the disk by holding the rotary drum on a rotary drum mounting jig, by bringing a reduced portion of the rotary drum mounting jig into engagement with the second mating surfaces and the second seating surfaces, fitting the rotary drum on the disk so that the mating surfaces are engaged and the rotary drum is seated on the first seating surfaces, and removing the rotary drum mounting jig from the rotary drum. After the rotary drum has been attached to the disk, the power feeding unit is attached to the rotary drum unit. Thus, the rotary drum can be attached to the disk coaxially with the spindle with a high accuracy. Since the power feeding members of the power feeding unit is attached to the disk fixedly holding the rotary drum, the rotary drum and the power feeding unit are disposed concentrically with a high accuracy and the rotary drum assembly operates in a satisfactory dynamic balance. Thus the present invention enables attaching a rotary drum to the disk with a reduced eccentricity and a reduced degree of dynamic unbalance.

Signals to be recorded and those reproduced by the magnetic heads, and power fed through the first power feeding members of the power feeding unit are transmitted to amplifying ICs and the like provided on the wiring board through the first connecting members. Power transmitted through the first power feeding members is transmitted to the first connecting members through the second connecting members.

The first connecting members facilitate disconnecting the wiring board fixedly provided on the rotary drum from conductors arranged on the disk without cutting the conductors in removing the rotary drum from the disk. The second connecting members facilitate disconnecting the terminals of the power feeding members from the terminals of the connector supporting member provided on the disk without cutting connecting wires in separating the first power feeding members from the disk.

DETAILED DESCRIPTION OF THE PREFERRED EMBODIMENTS

Figure 1:
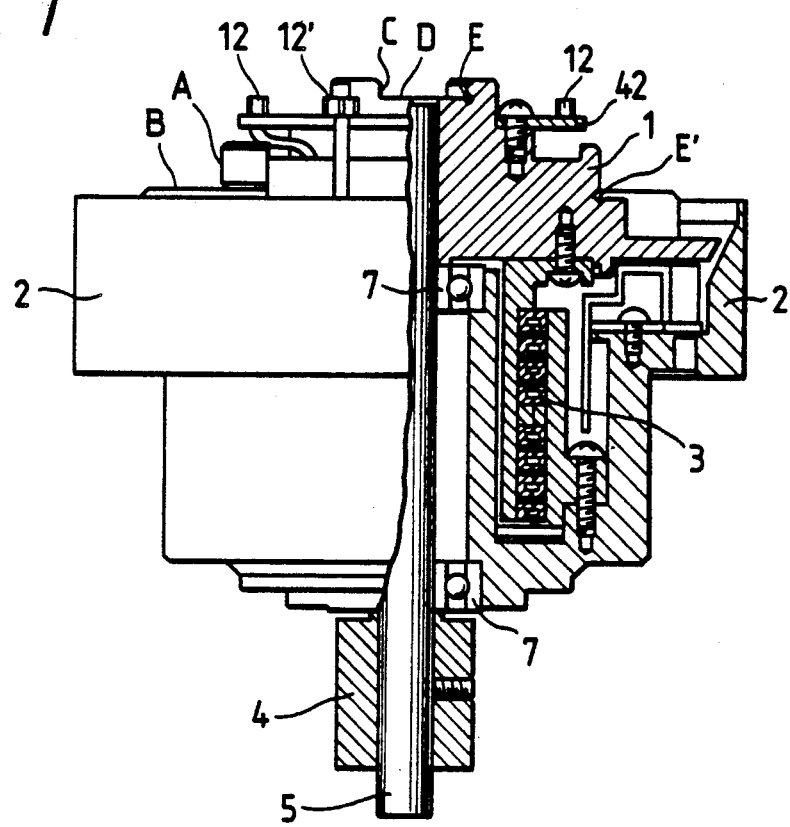
FIG. 1 is a partial cross-sectional front elevation of a rotary drum assembly in a preferred embodiment according to the present invention.
Figure 2:
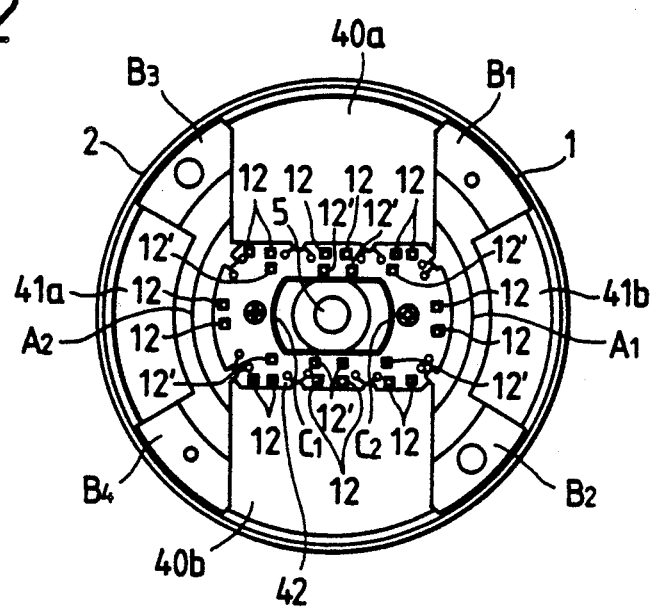
FIG. 2 is a top plan view of the rotary drum assembly of FIG. 1.

Referring to FIGS. 1 and 2 which illustrate a rotary drum assembly of the present invention in which a rotary drum 9 is removed as shown in these figures a spindle 5, fixedly pressed in a disk 1, is rotatably rotatably on bearings 7 on a stationary drum 2. A motor, not shown, drives the spindle 5 to rotate the disk 1 at a high rotating speed. Mating surfaces A ($A_1$ and $A_2$), and seating surfaces B ($B_1$, $B_2$, $B_3$ and $B_4$), formed on the disk 1, are contact surfaces which ar brought into contact with a corresponding contact surface formed in the rotary drum, not shown. These contact surfaces are finished with a high accuracy of, for example, 5 μm or below in roundness and 5 μm or below in runout with respect to the spindle 5. Grinding undercuts E' are formed in the machined surfaces of the disk 1 to enable the rotary drum to be attached to the disk 1 with a high accuracy. The upper portions of the mating surfaces A of the disk 1 are tapered to facilitate attaching the rotary drum to the disk 1.

Formed in the central portion of the upper end of the disk 1 with a high accuracy are reference mating surfaces C ($C_1$ and $C_2$) with which the corresponding mating surfaces of a jig for attaching the rotary drum 9 to the disk 1 mate and on which a holder holding slip rings (first power feeding members) included in a power feeding unit is fixed, and power feeding unit seating surface D. Similarly to the mating surfaces A and the seating surfaces B, the reference mating surfaces C and the power feeding unit seating surface D are provided with grinding recesses E. The upper edges of the reference mating surfaces C are chamfered or the upper portions of the reference mating surfaces C are tapered to facilitate attaching the rotary drum to the disk 1.

Referring particularly to FIG. 2, the mating surfaces $A_1$ and $A_2$ have the shape of a circular arc. Cavities 40a and 40b for receiving magnetic heads 10 are formed in the disk 1. The reference seating surfaces $B_1$ and $B_4$, and $B_2$ and $B_3$ are symmetrical with respect to the center of the disk 1. Cavities 41a and 41b for receiving other magnetic heads 10 are formed between the reference seating surfaces $B_1$ and $B_2$ and between the reference seating surfaces $B_3$ and $B_4$. Since the rotary drum 9 is seated on the reference seating surfaces $B_1$ to $B_4$, the rotary drum 9 can be attached to the disk 1 in a correct position, and the magnetic heads 10 can be held in a correct position at a correct height relative to the disk 1. A wiring board 42 is disposed radially inside the mating surfaces $A_1$ and $A_2$, and the mating surfaces $C_1$ and $C_2$ for holding the slip rings 8a of the power feeding unit 8 are formed inside the wiring board 42. The wiring board 42 is provided with socket connectors 12 and 12'. The socket connectors 12 are coupled with pin connectors 11 provided on an IC substrate 13. The socket connectors 12' are disposed nearer to the spindle 5 than the socket connectors 12 and are coupled with pin connectors 11' provided on a substrate 13'.

Figure 3:
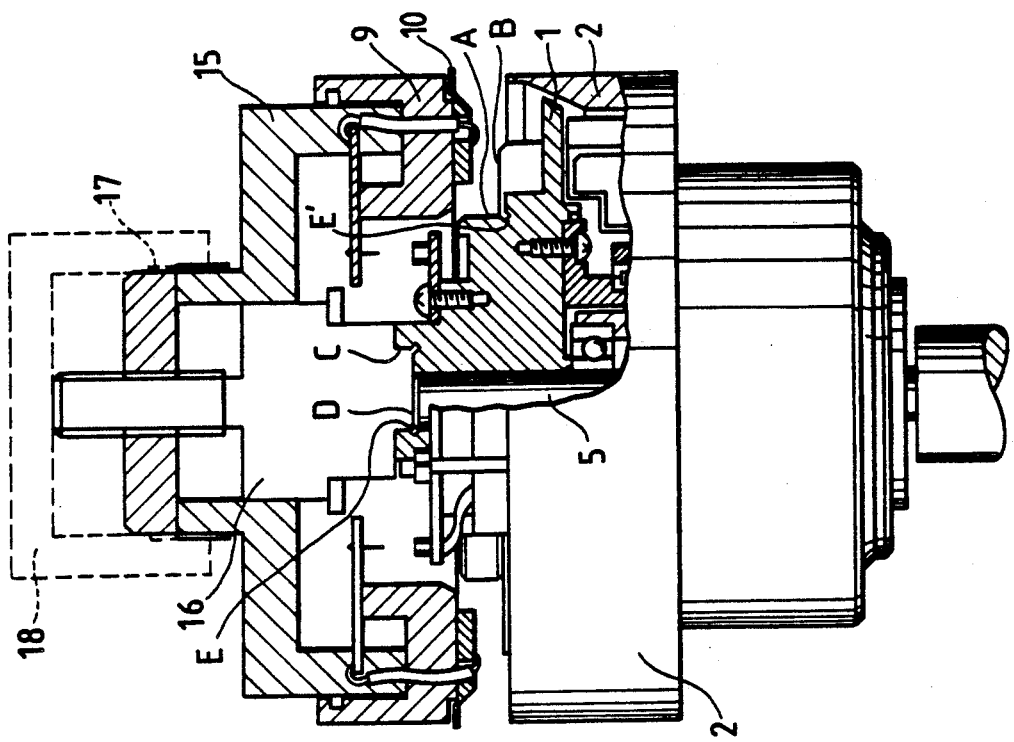
FIG. 3 is a partial cross-sectional front elevation of the rotary drum assembly of FIG. 1 combined with a power feeding unit.

Referring to FIG. 3, power fed through the brushes 8b and slip rings 8a of the power feeding unit 8 is transmitted through the substrate 13', the pin connectors 11' and the socket connectors 12 to the wiring board 42, and then through the socket connectors 12 and the pin connectors 11 to the IC substrate 13 provided on the rotary drum 9. The slip rings (first power feeding members) 8a are fixed to a slip ring holder 8c. The terminals of the brushes (second power feeding members) 8b are connected to an external power circuit.

The slip ring holders 8c and 8d are attached to the reference mating surfaces C and the reference seating surface D of the disk 1. In mating the slip ring holder 8d holding the slip rings 8a with the reference mating surfaces C and the reference seating surface D, the pin connectors 11' provided on the substrate 13' fixed to the lower surface of the slip ring holder 8d are coupled with and connected electrically to the socket connectors 12' provided on the wiring board 42 fixed to the disk 1. In seating the rotary drum 9 on the seating surfaces B of the disk 1 with its mating surfaces mating with the mating surfaces A of the disk 1, the pin connectors 11 provided on the IC substrate 13 fixed to the rotary drum 9 are coupled with and connected electrically to the socket connectors 12 provided on the wiring board 42 fixed to the disk 1.

Figure 6:
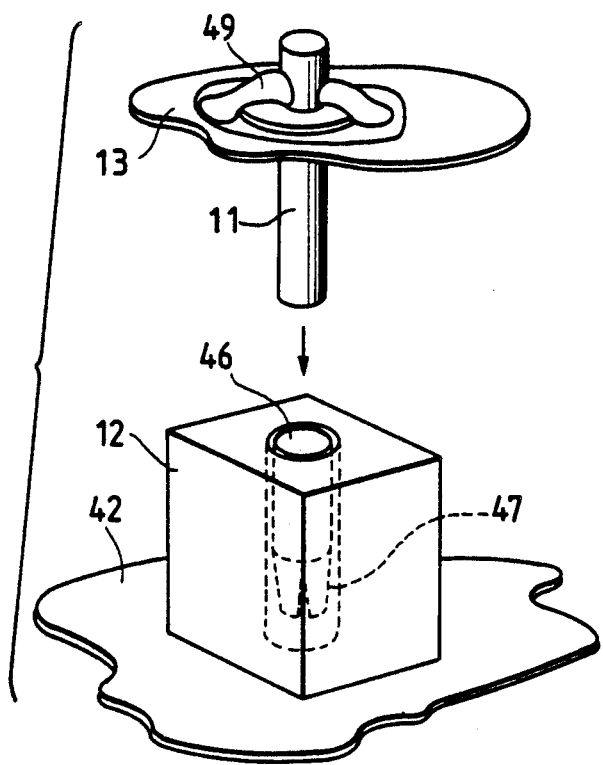
FIG. 6 is a perspective exploded view of a pin connector and a socket connector.
Figure 7:
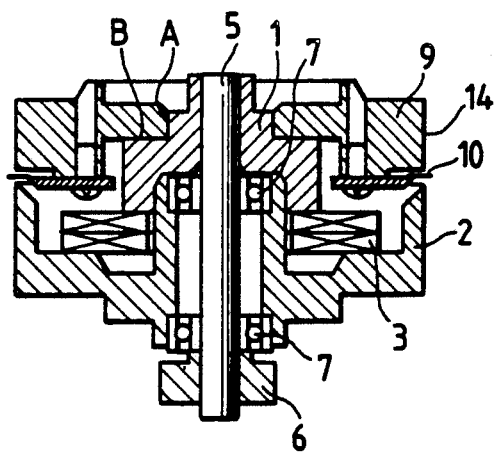
FIG. 7 is a longitudinal cross-sectional view of a conventional rotary drum assembly.

In recording information by the magnetic heads 10, recording signals are transmitted through a rotary transformer 3 supported on the fixed drum 2, the wiring board 42 provided on the disk 1, the socket connectors 12, the pin connectors 11 and the IC substrate 13 to the magnetic heads 10. In reproducing information by the magnetic heads 10, reproduced signals are transmitted from the magnetic heads 10 to the rotary transformer 3 through the same components in the reverse order. Referring to FIG. 6, each of the socket connectors 12 and 12' is soldered to the wiring board 42, and is provided internally with a metallic ring 46. The metallic ring 46 is provided integrally with an elastically deformable member 47 in its lower portion.

The pin connectors 11 and 11' are fixed by solder 49 respectively to the IC substrate 13 and the substrate 13' attached to the lower part of the power feeding unit 8. The class of fit is a transition fit or an interference fit. Diametrical difference $\Delta d$ is in the range of $-5$ to $+8$ $\mu m$. Concentricity is 5 $\mu m$ or below. Since the slip ring holder 8d of the power feeding unit 8 is seated o the reference mating surfaces C and the reference seating surface D with the pin connectors 11' of the substrate 13' attached to the slip ring holder 8d coupled with the socket connectors 12', the power feeding unit 8 is readily detachable. The reference mating surfaces C and the reference seating surface D locate the power feeding unit 8 in a satisfactory concentricity.

Figure 4:
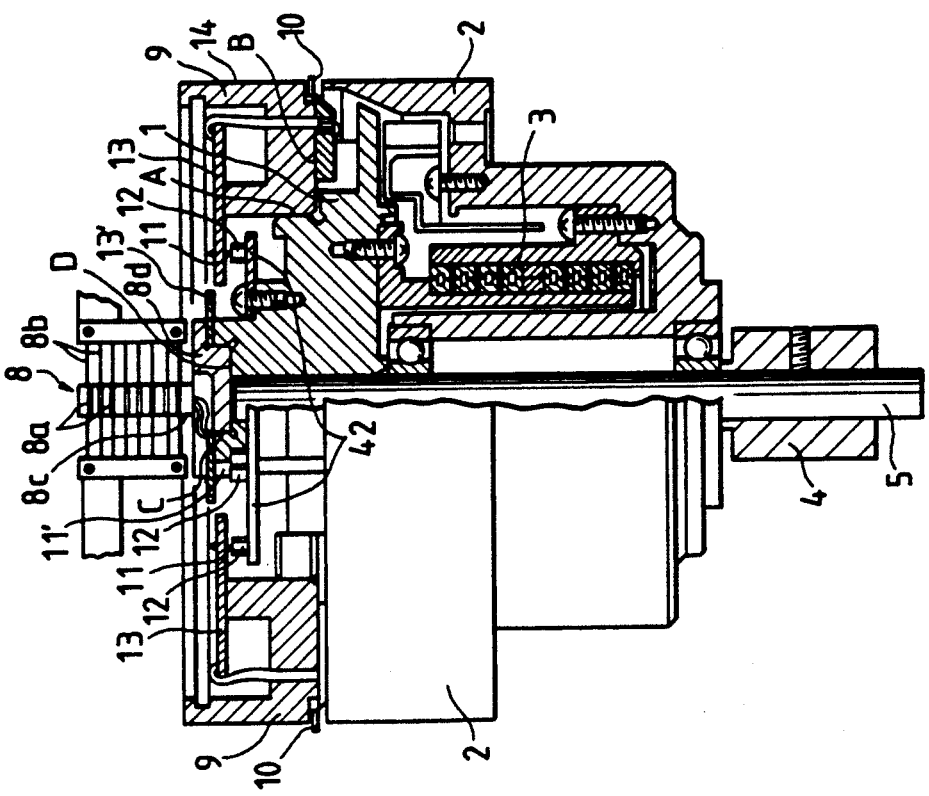
FIG. 4 is a partial cross-sectional front elevation view depicting a manner of replacing the rotary drum of the rotary drum assembly of FIG. 1.

Procedures for attaching the rotary drum 9 to and removing the same from the disk 1 will be described with reference to FIG. 4.

After removing the power feeding unit 8 from the disk 1, a second drum attaching jig 16 having mating surfaces to mate with the mating surfaces C and bottom surface to be seated on the seating surface D is threaded to the disk 1 with its mating surfaces and the bottom surface in close contact with the mating surfaces C and the seating surface D. The rotary drum 9 is screwed to a first drum attaching jig 15 with a tolerable eccentricity in the range of 10 to 20 $\mu m$. Then, the second drum attaching jig 16 is put on the first drum attaching jig 15. Then, a pressing handle 17 in threaded engagement with the threaded rod of the second drum attaching 16 is rotated to press the first drum attaching jig 15 holding the rotary drum 9 downward along the second drum attaching jig 16 to attach the rotary drum 9 to the disk 1 by pressing. Thus, the rotary drum 9 can very easily be attached to the disk 1. Since the rotary drum 9 and the disk 1 are finished with a high accuracy, operation for correcting the eccentricity of the rotary drum 9 relative to the disk 1 is unnecessary. After perfectly seating the rotary drum 9 on the reference seating surfaces B of the disk 1, the rotary drum 9 is fastened to the disk 1 with threaded fasteners, and then the first drum attaching jig 15 and the second drum attaching jig 16 are removed.

In removing the rotary drum 9 from the disk 1, the first drum attaching jig 15 is fastened to the rotary drum 9 and the second drum attaching jig 16 is fastened to the disk 1 with threaded fasteners, with the threaded fasteners fastening the rotary drum 9 to the disk 1 being removed, and the pulling handle 18 in threaded engagement with the threaded rod of the second drum attaching jig 16 is rotated to pull up the first drum attaching jig 15 together with the rotary drum 9 to remove the rotary drum 9 from the disk 1. The pressing handle 17 is removed from the threaded rod before starting the operation for removing the rotary drum 9 from the disk 1.

Thus, the rotary drum 9 can simply be attached to and removed from the disk 1. As shown in FIG. 3, this embodiment employs the socket connectors 12 and 12' and the pin connectors 11 and 11' for electrical connection of the circuits. Although the connecting reliability of those connectors is very high, those connectors have not been employed in the conventional rotary drum assembly in which the rotary drum and the disk are joined in a running fit, because those socket connectors and the pin connectors require a large separating force for separation. However, the present invention employs those socket connectors and the pin connectors without any trouble because the large separating force does not matter with the rotary drum assembly of the present invention. Located with a sufficiently high accuracy on the order of $\pm 50$ $\mu m$, the socket connectors and the pin connectors serve as guides in attaching the rotary drum 9 to the disk 1.

Figure 5:
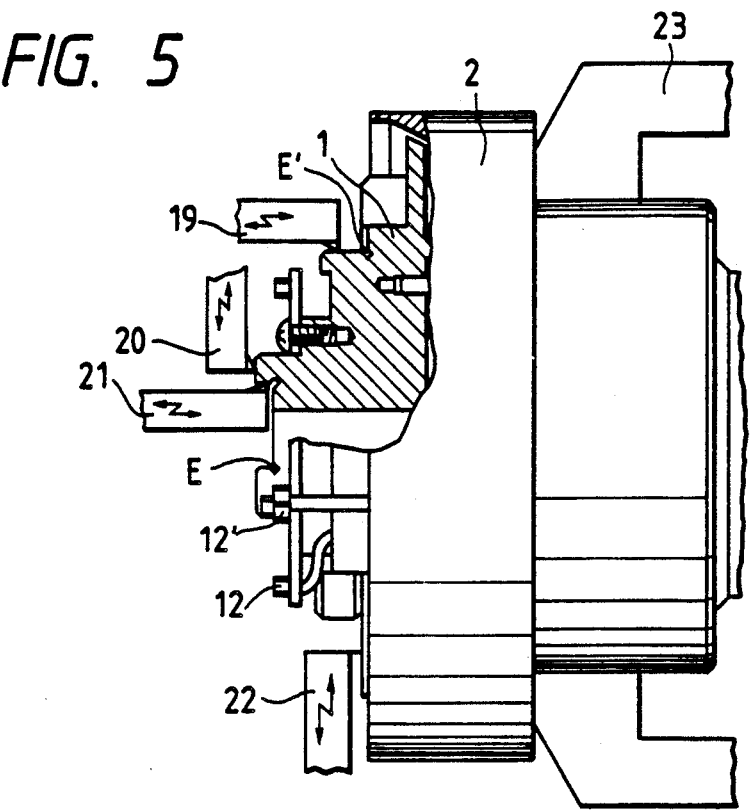
FIG. 5 is a partial cross-sectional front elevation of a manner of machining a disk for the rotary drum assembly of FIG. 1 with a high accuracy.

For precision machining of the disk 1 as shown in FIG. 5, the stationary drum 2 is held rigidly with a chuck 23, and the four surfaces of the disk 1 are machined simultaneously with four cutting tools 19, 20, 21 and 22. The grinding undercuts E and E' are formed in the surfaces to facilitate precision machining so that the disk 1 is finished with a high accuracy.

In the foregoing embodiment, the power is fed through the power feeding unit 8 to the electronic circuits of the IC substrate 13 including an amplifying circuit, however, the power may be used also for driving tracking control devices, such as piezoelectric devices and solenoid coils, for controlling the magnetic heads 10 for tracking.

As is apparent from the foregoing description, the rotary drum assembly of the present invention facilitates the replacement of the rotary drum and eliminates work for correcting the eccentricity of the contact surface of the rotary drum when the rotary drum is replaced, so that time necessary for replacing the rotary drum is significantly reduced and the replacement of the rotary drum is simplified.

Furthermore, since the rotary drum and the power feeding unit are automatically located on the disk with a high accuracy by the mating surfaces and the seating surface formed in the disk fixed to the spindle, the rotary drum assembly is able to operate in an accurate, stable dynamic balance and hence the stable scanning performance of the magnetic heads can be secured.

What is claimed is:

1. A rotary drum assembly for a VTR, the rotary drum assembly comprising:

a plurality of magnetic head means for scanning a magnetic tape to record or reproduce signals;

a rotary drum fixedly holding the magnetic head means on a peripheral portion thereof and having a peripheral cylindrical wall;

a stationary drum disposed beneath and concentric with the rotary drum and having a peripheral wall for guiding the magnetic tape along an outer circumference thereof at a set position and in a predetermined direction;

disk means coaxially fixed to a spindle for detachably holding the rotary drum on a peripheral portion thereof;

a wiring board provided on the rotary drum and connected to terminals of the magnetic head means;

a power feeding unit comprising first power feeding members fixedly held on the disk means concentrically with respect to the spindle, and second power feeding members provided on a fixed portion of the VTR;

a connector holding fixed to the disk means at a position inside an inner circumferential surface of the rotary drum adapted to mate with an outer circumferential surface of the disk means, and having first connecting terminals and second connecting terminals, said inner circumferential surface of said rotary drum and said outer circumferential surface of the disk means forming mating surfaces; and connecting means comprising first connecting members disposed radially inside the mating surfaces of the rotary drum and the disk means and connecting the first connecting terminals on the connector holding member with the wiring board, and second connecting members connecting the second connecting terminals on the connector holding member with the first power feeding members of the power feeding unit.

2. A rotary drum assembly for a VTR according to claim 1, wherein the first power feeding members of said power feeding unit are disposed at a position radially inwardly of the first and second connecting members.

3. A rotary drum assembly for a VTR according to claim 1, wherein the first power feeding members of said power feeding unit are conductive rings, and the second power feeding members of the same are conductive brushes in contact with the first power feeding members.

4. A rotary drum assembly for a VTR according to claim 1, wherein the first and second connecting members of said connecting means have conductive contacts which are brought into contact with each other so as to complete electrical circuits.

5. A rotary drum assembly for a VTR according to claim 1, wherein said first connecting members are respectively rigidly connected to the first connecting terminals on the connector holding member and to the wiring board, and said second connecting members are rigidly connected to the second connecting terminals on the connector holding member and to the second connecting terminals on the connector holding member and to the connecting terminals of the first power feeding members.

6. A rotary drum assembly for a VTR according to claim 1, wherein one of the first connecting members or the second connecting members are pin connectors, and the other of said first connecting members and said second connecting members are socket connectors.

7. A rotary drum assembly according to claim 1, wherein said first connecting members each includes connecting means for transmitting recording signals to be recorded by the magnetic head means or signals reproduced by the magnetic head means, and a connecting means for transmitting power fed through the first power feeding member of said power feeding unit, and said second connecting members each includes connecting means for transmitting power fed through the first power feeding member of said power feeding unit.

8. A rotary drum assembly for a VTR according to claim 1, wherein said first connecting members are disposed radially outwardly of said second connecting members.

* * * * *